United States Patent
Ljung et al.

(10) Patent No.: US 9,049,559 B2
(45) Date of Patent: Jun. 2, 2015

(54) METHODS, SYSTEMS AND COMPUTER PROGRAM PRODUCTS FOR ANONYMOUS TRACKING OF OBJECTS

(75) Inventors: Peter Ljung, Lund (SE); Johan Wadman, Lund (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 464 days.

(21) Appl. No.: 13/496,976

(22) PCT Filed: Apr. 20, 2011

(86) PCT No.: PCT/IB2011/000867
§ 371 (c)(1),
(2), (4) Date: Jul. 9, 2012

(87) PCT Pub. No.: WO2012/143743
PCT Pub. Date: Oct. 26, 2012

(65) Prior Publication Data
US 2012/0268244 A1    Oct. 25, 2012

(51) Int. Cl.
*H04W 4/02* (2009.01)
*G06Q 10/08* (2012.01)
(Continued)

(52) U.S. Cl.
CPC ............ *H04W 4/028* (2013.01); *G06Q 10/087* (2013.01); *G08B 21/0275* (2013.01); *G08B 13/2462* (2013.01); *H04L 63/0428* (2013.01); *H04L 67/18* (2013.01)

(58) Field of Classification Search
CPC ............ G06Q 10/08–10/087; G08B 13/2462; G08B 21/0261–21/0277; H04W 4/02–4/028; H04L 67/18
See application file for complete search history.

(56) References Cited

U.S. PATENT DOCUMENTS 6,259,367 B1 *  7/2001  Klein ..................... 340/572.1
6,738,628 B1 *  5/2004  McCall et al. ........... 455/456.1
(Continued)

FOREIGN PATENT DOCUMENTS

EP         1 589 471 A2    10/2005
KR     2010 0070948 A      6/2010
(Continued)

OTHER PUBLICATIONS

Notification Concerning Transmittal of International Preliminary Report on Patentability in corresponding PCT Application No. PCT/IB2011/000867 mailed Oct. 31, 2013 (10 Pages).
(Continued)

*Primary Examiner* — Hai Phan
*Assistant Examiner* — Orlando Bousono
(74) *Attorney, Agent, or Firm* — Myers Bigel Sibley & Sajovec, PA

(57) ABSTRACT

Systems and methods of providing location information associated with moveable objects include receiving tag identification (ID) information reports from a plurality of tag sensors. A movable object associated with each of the ID information reports received from the tag sensors is identified. Location information associated with the movable objects is updated responsive to the received ID information reports to provide updated location information for the moveable objects and an owner associated with each of the movable objects is determined. Access to the location information associated with respective ones of the movable objects is allowed only to requestors authorized by the owner associated with the respective ones of the movable objects, wherein the tag sensors have not been provided notification of ID information associated with the movable objects or of the owners associated with the moveable objects.

15 Claims, 12 Drawing Sheets

(51) Int. Cl.
    *G08B 21/02*     (2006.01)
    *G08B 13/24*     (2006.01)
    *H04L 29/08*     (2006.01)
    *H04L 29/06*     (2006.01)

(56) References Cited

U.S. PATENT DOCUMENTS

| | | | |
|---|---|---|---|
| 7,102,509 B1* | 9/2006 | Anders et al. | 340/539.13 |
| 7,603,352 B1* | 10/2009 | Vassallo et al. | 1/1 |
| 7,911,346 B1* | 3/2011 | Claudatos et al. | 340/572.4 |
| 8,847,761 B1* | 9/2014 | Claudatos et al. | 340/572.1 |
| 2002/0147650 A1* | 10/2002 | Kaufman et al. | 705/22 |
| 2002/0181667 A1* | 12/2002 | Campbell | 379/45 |
| 2003/0095032 A1 | 5/2003 | Hoshino et al. | |
| 2004/0235493 A1* | 11/2004 | Ekerborn | 455/456.1 |
| 2005/0024211 A1* | 2/2005 | Maloney | 340/572.1 |
| 2005/0035860 A1 | 2/2005 | Taylor et al. | |
| 2005/0064867 A1* | 3/2005 | Nitta | 455/432.3 |
| 2005/0116823 A1* | 6/2005 | Paulsen et al. | 340/539.13 |
| 2005/0199716 A1* | 9/2005 | Shafer et al. | 235/385 |
| 2005/0200478 A1* | 9/2005 | Koch et al. | 340/539.13 |
| 2005/0236479 A1* | 10/2005 | Schmidtberg et al. | 235/384 |
| 2006/0022030 A1* | 2/2006 | Boothroyd | 235/375 |
| 2006/0033623 A1* | 2/2006 | Hines et al. | 340/572.1 |
| 2006/0044115 A1 | 3/2006 | Doi et al. | |
| 2006/0055538 A1 | 3/2006 | Ritter | |
| 2006/0063540 A1* | 3/2006 | Beuck | 455/456.3 |
| 2006/0071790 A1* | 4/2006 | Duron et al. | 340/572.1 |
| 2006/0158310 A1* | 7/2006 | Klatsmanyi et al. | 340/10.1 |
| 2006/0208925 A1* | 9/2006 | Wassingbo | 340/990 |
| 2007/0090951 A1* | 4/2007 | Chan et al. | 340/572.1 |
| 2007/0136152 A1* | 6/2007 | Dunsker et al. | 705/28 |
| 2007/0168127 A1* | 7/2007 | Zaruba et al. | 701/220 |
| 2007/0241901 A1* | 10/2007 | Cage et al. | 340/572.1 |
| 2008/0042840 A1* | 2/2008 | Christopher | 340/572.1 |
| 2008/0122584 A1 | 5/2008 | Itasaki et al. | |
| 2008/0302871 A1* | 12/2008 | Rehman | 235/385 |
| 2009/0012667 A1* | 1/2009 | Matsumoto et al. | 701/26 |
| 2009/0058651 A1* | 3/2009 | Thorn | 340/572.1 |
| 2009/0192872 A1* | 7/2009 | Moritz et al. | 705/10 |
| 2010/0082457 A1 | 4/2010 | Eisenberg et al. | |
| 2010/0159953 A1* | 6/2010 | Aubert et al. | 455/456.2 |

FOREIGN PATENT DOCUMENTS

| | | |
|---|---|---|
| WO | WO 00/37958 A2 | 6/2000 |
| WO | WO 01/31600 A1 | 5/2001 |
| WO | WO 2006/092220 A2 | 9/2006 |
| WO | WO 2007/125319 A1 | 11/2007 |

OTHER PUBLICATIONS

International Search Report Corresponding to International Application No. PCT/IB2011/000867; Mailing Date: Feb. 16, 2012; 16 Pages.

\* cited by examiner

METHODS, SYSTEMS AND COMPUTER PROGRAM PRODUCTS FOR ANONYMOUS TRACKING OF OBJECTS

RELATED APPLICATION

The present application is a 35 U.S.C. §371 national stage application of PCT International Application No. PCT/IB2011/000867, having an international filing date of Apr. 20, 2011, the disclosure of which is incorporated by reference herein in its entirety.

FIELD OF THE INVENTION

This invention relates to locating services and anonymous tags, and more particularly to locating services for objects that may be movable.

BACKGROUND OF THE INVENTION

It has been proposed in U.S. Pat. No. 7,248,167 ("the '167 Patent") to use Radio Frequency Identification (RFID) signals to provide updated location information about movable objects owned by the owner. However, the methods in the '167 describe approaches where the owner or those authorized by the owner are used as RFID in locating the objects.

SUMMARY OF INVENTION

In some embodiments of the present invention, computer-implemented methods of providing location information associated with moveable objects includes receiving tag identification (ID) information reports from a plurality of tag sensors. A movable object associated with each of the ID information reports received from the tag sensors is identified. Location information associated with the movable objects is updated responsive to the received ID information reports to provide updated location information for the moveable objects and an owner associated with each of the moveable objects is determined. Access to the location information associated with respective ones of the movable objects is allowed only to requestors authorized by the owner associated with the respective ones of the movable objects, wherein the tag sensors have not been provided notification of ID information associated with the movable objects or of the owners associated with the moveable objects.

In further embodiments, updating location information includes, for respective ones of the ID information reports, determining an identity of a reporting one of the tag sensors providing the respective one of the ID information reports, estimating a location of the identified reporting one of the tag sensors and updating the location information for the movable object associated with the respective one of the ID information reports based on the estimated location of the reporting one of the tag sensors. Updating location information may further include quality weighting selected ones of the received ID information reports based on a reliability characteristic for the reporting tag sensors providing the selected ones of the received ID information reports. The reliability characteristic may be an association between the reporting ones of the tag sensors and the owner associated with the movable object associated with the respective selected ones of the ID information reports.

In other embodiments, updating location information further includes grouping a plurality of the received ID information reports associated with a same one of the movable objects based on a filter time window of times associated with the respective ID information reports. Locations of the identified reporting ones of the tag sensors for the grouped plurality of received ID information reports are compared. Selected ones of the grouped plurality of received ID information reports are discarded based on comparing the locations of the identified ones of the tag sensors.

In further embodiments, receiving ID information reports includes receiving a first ID information report associated with a first movable object from a first tag sensor, the first tag sensor having an associated location accuracy, receiving a second ID information report associated with the first movable object from a second tag sensor, the second tag sensor having an associated location accuracy less than that of the first tag sensor and receiving a third ID information report associated with a second movable object from the second tag sensor. Each of the second and third ID information reports has an associated time falling within a same sample window. Updating location information includes updating the location information for the first movable object based on the estimated location of the first tag sensor, not the estimated location of the second tag sensor, and updating the location information for the second movable object based on the updated location information for the first movable object responsive to receiving the second and third ID information reports having associated times falling within the sample window. The first tag sensor may be a mobile terminal having GPS location information and the second tag sensor may be a mobile terminal not having GPS location information.

In other embodiments, identifying a movable object includes comparing ID information from the ID information report with stored information associating ID information with respective ones of the movable objects and the method further includes changing the ID information associated with the respective ones of the movable objects at selected times.

In further embodiments, the tag sensors are mobile terminals and receiving the ID information reports is preceded by receiving a tag identification using a short range wireless transmission protocol at one of the plurality of tag sensors. The one of the plurality of tag sensors does not know what object is associated with the received tag identification. The received tag identification is formatted as an ID information report. The ID information report is transmitted to a location service over a wide area cellular network communicatively coupled to the one of the plurality of tag sensors. The tag identification may be received from a battery powered electronic tag configured to transmit its tag identification at specified intervals using the short range wireless protocol. The tag may further include a memory including a plurality of identifications and the tag may be configured to select a different one of the plurality of identifications to transmit as its tag identification at specified intervals.

In some embodiments, the tag has a unique identity number and the tag is further configured to repeatedly determine a new variable number, add (append) the new variable number to the identity number to provide identification data for the tag, encode the identification data for transmission as the tag identification and transmit the tag identification using the short range wireless protocol. Determining a new variable, adding and encoding are repeated so that the transmitted tag identification is changed after a selected interval.

In yet further embodiments, a computer-implemented method of providing location information associated with moveable objects includes receiving a tag identification at a mobile terminal using a short range wireless transmission protocol. The mobile terminal does not have any knowledge of the source of the received tag identification. The received tag identification is formatted as an ID information report.

The ID information report is transmitted to a location service over a wide area cellular network communicatively coupled to the mobile terminal. Receiving, formatting and transmitting may be carried out for a plurality of tag identifications received by the mobile terminal from a location of the mobile terminal and formatting the received tag information may include adding location information for the mobile terminal to the ID information report.

In other embodiments, a location server for providing location information associated with movable objects includes a processor and a memory coupled to the processor that includes, for each of the movable objects, identification information associated with the respective movable object and an owner associated with the respective movable object. A communication interface coupled to the processor is configured to receive tag identification (ID) information reports from tag sensors. An object location module executing on the processor is configured to update location information associated with the movable objects, that is stored in the memory, responsive to received ID information reports, to provide updated location information for the moveable objects. A data access module executing on the processor is configured to allow access to the location information associated with respective ones of the movable objects only to requestors authorized by the owner associated with the respective ones of the movable objects. The tag sensors have not been provided notification of the identification information associated with the respective movable objects or of the owners associated with the respective moveable objects.

In further embodiments, the object location module includes a filter module that is configured to select between received ones of the ID information reports to increase the accuracy of the stored updated location information for the movable objects. The object location module may include a tag sensor locator module that is configured to estimate a location of a tag sensor providing respective ones of the ID information reports and the object location module may be configured to update the location information based on the estimated location of the tag sensor providing the respective ones of the ID information reports.

In other embodiments, a method for providing an anonymous short range wireless transmitter tag for use in locating a movable object includes, at a tag, determining a unique identity number for the tag and determining a variable number for inclusion with the unique identity number. The variable number is added (appended) to the identity number to provide identification data for the tag. The identification data is encoded for transmission by the short range wireless transmitter as a tag identification. The tag identification is transmitted using a short range wireless protocol. A new variable number is determined. The new variable number is added to the identity number to provide new identification data for the tag. The new identification data is encoded for transmission by the short range wireless transmitter as a new tag identification. The new tag identification is transmitted using the short range wireless protocol. Determining a new variable number, adding the new variable number, encoding and transmitting are repeated using the new tag identification for the tag after a selected interval. The variable number and the new variable number may be time associated stamps, which may be timestamps generated by the tag based on a clock of the tag. The time associated stamps may be sequence numbers generated by the tag based on a number of transmissions of the tag identification since an initial reference transmission. The selected interval may be no greater than one hour. The short range wireless protocol may not use a static identification, such as a Media Access Control (MAC) address. The short range wireless protocol may be the ANT protocol.

In further embodiments, determining a variable number further includes generating a random number for use in a padding scheme based on a method used for encoding the identification data. Adding (appending) the variable number further includes adding the random number to the variable number and the identity number to provide the identification data for the tag.

In other embodiments, encoding the identification data is preceded by calculating a cyclical redundancy check (CRC) for the identification data and adding the CRC to the identification data. Encoding the identification data includes encoding the identification data and CRC for transmission by the short range wireless transmitter as the tag identification. Encoding the new identification data may include identifying a public key for use in encoding the new identification data and repeating determining a new variable number may be preceded by selecting a new public key for use in encoding the new identification data and encoding the new identification data may include encoding the new identification data using the new public key. Selecting the new public key may be performed by the tag based on a table of public keys to be used in sequence stored on the tag.

In further embodiments, a server computer remote from the tag receives the transmitted new tag identification from a tag sensor that received the new tag identification from the tag A candidate private key to use in decoding the received tag identification is selected using information about public keys provided to both the tag and the server computer that was not provided to the tag sensor. The received tag identification is decoded using the selected private key. An error is detected based on a CRC extracted from the decoded tag identification. A next candidate private key to use in decoding the received tag identification is selected responsive to detecting the error. The received tag identification is re-decoded using the next candidate private key. An error is checked for in the re-decoded tag identification. The unique identity number is extracted from the decoded tag identification and the tag transmitting the received tag identification is identified based on the extracted unique identity number when no error is detected in the re-decoded tag identification. Selecting a next candidate private key, re-de-coding the received tag identification, checking for an error and extracting the unique identifying number are repeated when an error is detected in the re-decoded tag identification.

In other embodiments, a server computer remote from the tag receives the transmitted new tag identification from a tag sensor that received the new tag identification from the tag and determines a key to use in decoding the received tag identification using information provided to both the tag and the server computer that was not provided to the tag sensor. The received tag identification is decoded using the determined key. The unique identity number is extracted from the decoded tag identification. The tag transmitting the received tag identification is identified based on the extracted unique identity number.

[match claim] In yet other embodiments, an anonymous tag includes a processor and a short range wireless transmitter coupled to the processor. A memory coupled to the processor includes a unique identity number for the tag and a key for use in encoding by the tag. A tag identification module of the tag is configured to execute on the processor that repeatedly determines a new variable number for inclusion with the unique identity number, adds the new variable number to the identity number to provide identification data for the tag and encodes the identification data for transmission by the short range wireless transmitter as a tag identification. The short range wireless transmitter transmits the tag identification.

Computer program products and computing devices including other aspects of the methods described above are also provided.

DETAILED DESCRIPTION OF PREFERRED EMBODIMENTS

Figure 1:
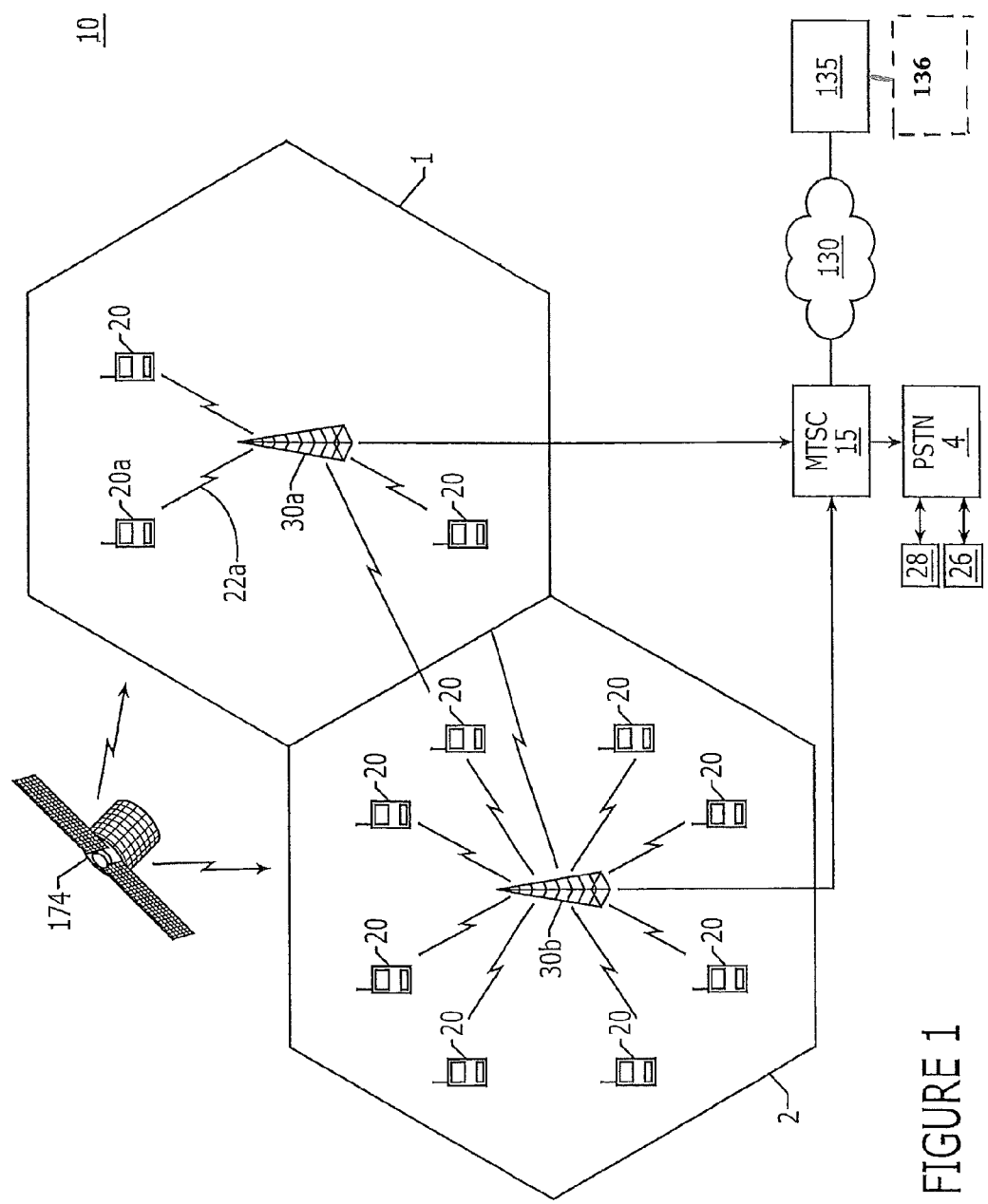
FIG. 1 is a schematic illustration of a wireless communications network that provides service to mobile terminals according to some embodiments of the invention.

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "module," "circuit" and "controller" may take the form of digital circuitry, such as computer-readable program code executed by an instruction processing device(s) (e.g., general purpose microprocessor and/or digital signal processor), and/or analog circuitry.

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

It will be understood that the invention may be practiced with any mobile terminal as a tag sensor or other devices as the tag sensor that are coupled to a communications network. A mobile terminal may be, for example, a single or dual mode cellular radiotelephone with or without a multi-line display; a Personal Communications System (PCS) terminal that may combine a cellular radiotelephone with data processing, facsimile and data communications capabilities; a Personal Data Assistant (PDA) that can include a mobile terminal, pager, Internet/intranet access, Web browser, organizer, calendar and/or a global positioning system (GPS) receiver; and a conventional laptop and/or palmtop receiver or other appliance all of which include a radiotelephone transceiver. The mobile terminal may also support Wifi communication over a local wireless network or the like. While generally described herein with the tag sensors as mobile devices moving into proximity of a movable object being located, it will be understood that the tag sensors may also be non-mobile devices having locations associated therewith that detect movement of a movable object into their proximity (i.e., within range of a short range wireless protocol network supported by the tag sensor).

It will be understood mobile terminals according to the invention may operate in any type of wireless communications network. In some embodiments according to the invention, for example, the network may provide services broadly labeled as PCS (Personal Communications Services) including advanced digital cellular systems conforming to standards such as IS-136 and IS-95, lower-power systems such as DECT (Digital Enhanced Cordless Telephone), data communications services such as CDPD (Cellular Digital Packet Data), and other systems such as CDMA-2000, that are proposed using a format commonly referred to as Wideband Code Division Multiple Access (WCDMA).

As described herein in greater detail, in some embodiments according to the invention, the mobile terminal (or other tag sensor) periodically receives unique Identification (ID) Information from tags coupled to moveable objects, such as a wallet, an automobile, a briefcase, a set of keys, etc. The mobile terminal can determine location information (or have location information determined), using for example GPS, which may be provided to a location service/computer server (location server) where this location information may be associated with the ID Information for each moveable object. As the location information is periodically determined, it can be used to update the location information for the moveable objects. If a user suspects that a moveable object has been lost or misplaced, the user could then access the location information. The location information can also include a time at which the most recently known location information for the moveable object was established. The user may refer to the time to gain further insight into where the moveable object may have been misplaced or dropped.

FIG. 1 is a diagram that illustrates a wireless communications network (network) 10 that supports communications in which mobile terminals 20 according to the invention can be used. Networks 10 are commonly employed to provide voice and data communications to subscribers using, for example, the standards discussed above. According to FIG. 1, the mobile terminals 20 can communicate with each other via a Mobile Telephone Switching Center (MTSC) 15. The mobile terminals 20 can also communicate with other terminals, such as terminals 26, 28, via a Public Service Telephone Network (PSTN) 4 that is coupled to the network 10. As also shown in FIG. 1, the MTSC 15 is coupled to a computer server 135 supporting a location service 136 (i.e., a location server) via a network 130, such as the Internet.

The network 10 is organized as cells 1-2 that collectively can provide service to a geographic region. In particular, each of the cells can provide service to associated sub-regions included in the geographic region covered by the network 10. More or fewer cells can be included in the network 10, and the coverage area for the cells may overlap. Each of the cells may include an associated base station 30a-b. The base stations 30a-b can provide wireless communications between each other and the mobile terminals 20 in the associated geographic region to allow for communications therebetween.

Each of the base stations 30a-b can transmit/receive data to/from the mobile terminals 20 over an associated control channel. For example, the base station 30a in cell 1 can communicate with the mobile terminal 20a over the control channel 22a. The control channel 22a can be used, for example, to page the mobile terminal 20a in response to calls directed thereto or to transmit traffic channel assignments to the mobile terminal 20a over which a call associated therewith is to be conducted.

The mobile terminals 20 may also be capable of receiving messages from the network 10 over the respective control channel 22. In some embodiments according to the invention, the mobile terminals receive Short Message Service (SMS) or Enhanced Message Service (EMS) formatted messages, Multimedia Message Service (MMS), and/or Smartmessaging™ formatted messages.

A Global Positioning System (GPS) 174 can provide GPS information to the geographic region including cells 1-2 so that the mobile terminals 20 may determine location information. The location information can be applied to identification information received by the mobile terminals from tags coupled to moveable objects. As described herein in greater detail, the network 10 may also provide network location information as the basis for the location information applied by the mobile terminals. In addition, the location information may be provided directly to the server 135 rather than to the mobile terminals 20, which then may provide the location information to the server 135.

Figure 2:
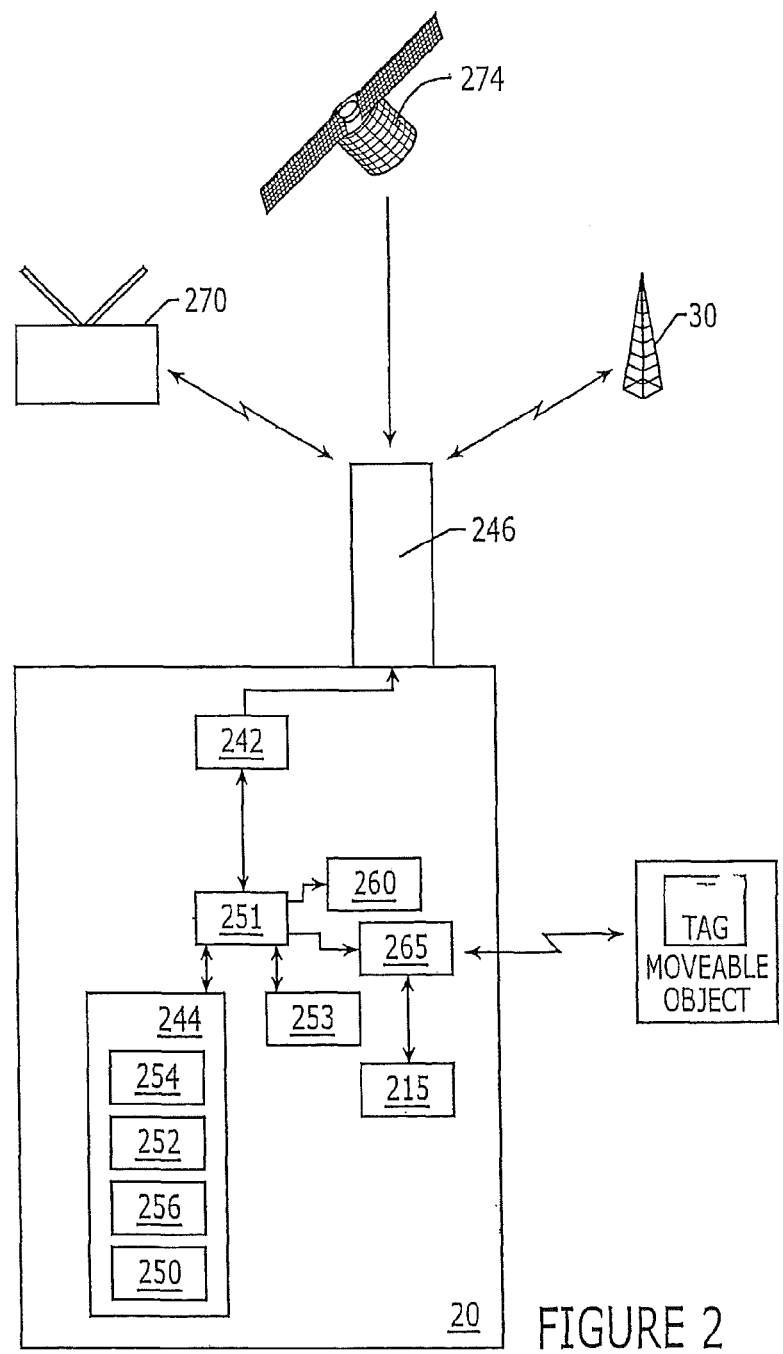
FIG. 2 is a schematic block diagram that illustrates mobile terminals as tag sensors according to some embodiments of the invention.

FIG. 2 is a block diagram that illustrates embodiments of mobile terminals 20 according to the invention. As illustrated in FIG. 2, the mobile terminal 20 includes a transceiver circuit 242 that is operative to transmit and receive radio frequency communication signals to the network 10 via an antenna system 246. The antenna system 246 may include an antenna feed structure and one or more antennas.

As is well known to those of skill in the art, a transmitter portion of the transceiver 242 converts information, which is to be transmitted by the mobile terminal 20, into electromagnetic signals suitable for radio communications. A receiver portion of the transceiver 242 demodulates electromagnetic signals, which are received by the mobile terminal 20 from the network 10 to provide the information contained in the signals in a format understandable to the user.

A user interface 244 of the mobile terminal 20 may include a variety of components, such as a display 254, a keypad 252, a speaker 256, and a microphone 250, operations of which are known to those of skill in the art. It will be understood that the functions of the keypad 252 and the display 254 can be provided by a touch screen through which the user can view information, such as computer displayable documents, provide input thereto, and otherwise control the mobile terminal 20.

A processor circuit 251 provides for overall operation of the mobile terminal 20 including coordination of communications via the transceiver circuit 242, the user interface 244, and other components included in the mobile terminal 20. For example, the processor circuit 251 can provide communications signals to the transceiver circuit 242 when the user speaks into the microphone 250 and receives communications signals from the transceiver 242 for the reproduction of audio through the speaker 256. The processor circuit 251 can generate characters for display on the display 254. For example, the processor circuit 251 can generate numbers for display when the user enters a telephone number on the keypad 252. The characters can also be generated by a character generator circuit, which is not shown.

Processor circuit 251 may be configured to communicate data over the radio transceiver circuit 242 according to one or more communication protocols, such as one or more cellular communication protocols and/or other communication protocols. The cellular communication protocols may include, but are not limited to, Advanced Mobile Phone Service (AMPS), ANSI-136, Global Standard for Mobile (GSM) communication, General Packet Radio Service (GPRS), enhanced data rates for GSM evolution (EDGE), code division multiple access (CDMA), wideband-CDMA, CDMA2000, and/or Universal Mobile Telecommunications System (UMTS). The other communication protocols may include, but are not limited to, Bluetooth, RFID, and/or WLAN (e.g., 802.11a, 802.11b, 802.11e, 802.11g, and/or 802.11i).

The processor circuit 251 may be implemented using a variety of hardware and software. For example, operations of the processor circuit 251 may be implemented using special-purpose hardware, such as an Application Specific Integrated Circuit (ASIC) and programmable logic devices such as gate arrays, and/or software or firmware running on a computing device such as a microprocessor, microcontroller or digital signal processor (DSP). The processor circuit 251 may provide digital signal processing operations such as scanning for an acceptable control channel, camping on a control channel (including maintaining synchronization with the base station that communicates with the mobile terminal 20), Voice Activated Dialing (VAD) services, performing media operations and the like.

The mobile terminal 20 includes a tag reader circuit 265 that is configured to support receiving and formatting for transmission to a location service tag identifications received from transmitting tags in proximity to the mobile terminal 20. The tag reader circuit 265 is configured to receive tag identifications using a short range wireless transmission protocol even when the mobile terminal 20 does not have any knowledge of the source of the received tag identification. The tag reader circuit is further configured to format the received tag identification as an ID information report and transmit the ID information report to a location service over a wide area cellular network communicatively coupled to the mobile terminal 20, such as through the base station 30. As the mobile terminal 20 need not have any knowledge of the source of the received tag identification, substantially all users may collect location information for all tags that are in proximity to the tag sensors (mobile terminals 20). This collection, formatting and transmitting may be done autonomously so that it should not affect the usability of the mobile terminal 20 for the user of the mobile terminal 20.

As will be further described in, this may be done anonymously to limit or prevent any integrity issues related to collecting location information for tags that the user does not own (or are not owned by someone who has established the user as authorized to act for the owner). The only entity that need know the tags real identity (and owner) may be a internet cloud based server computer hosting a location service. The location service may only permit location information for the object to be communicated to the object's owner and secondary users permitted by the owner of the tag.

The "tag" can be attached to the moveable objects and may be any shape/size that can be incorporated into/on the moveable objects. The moveable objects can be wallets, keys, mobile telephones, clothing, automobiles, and may even be included in printed inks on, for example, paper. Other moveable objects can also incorporate tags. The range of the short range wireless transmission protocol and supporting devices assures that any such identified objects are within a close proximity of the mobile terminal 20 at the time of receipt of the tag identification by the mobile terminal 20.

The information stored in the tag can be identification (ID) information that can uniquely identify the moveable object associated with the tag. For example, two different moveable objects can have respective tags that each store different ID information that can be used to distinguish the two moveable objects. It will be understood that the interface circuit 265 includes an antenna (not shown) via, which the short range wireless signals are received. The short range antenna can be included in the antenna system 246 or can be a separate structure (internal or external). The mobile terminal 20 can also include a tag 215 that includes ID information that uniquely identifies the mobile terminal 20 (as a moveable object according to some embodiments of the invention).

The mobile terminal 20 includes a location determination circuit 260. The location determination circuit 260 may be configured to determine the location of the mobile terminal 20 in a variety of ways, some of which will now be described. However, it will be understood that, in some embodiments, the mobile terminal 20 itself need not know or determine its own location and report the same to the location service where that information is available to the location service from another source.

In some embodiments according to the invention, the location determination circuit 260 is a Global Positioning System (GPS) location circuit, including a GPS receiver circuit, that uses, for example, any available GPS or assisted GPS based location approach in conjunction with a GPS satellite system 274. Such approaches are commonly referred to as assisted-GPS, which is defined, for example, in specification numbers 3GPP TS 04.31, 3GPP TS 03.71 and 3GPP TS 04.35. Assisted-GPS approaches are also discussed, for example, in U.S. Pat. Nos. 4,445,118, and 5,418,538, and 5,663,734, and 5,663,735, and 6,433,735, and in published US Patent Application No. US 2003/0011511 A1, the disclosures of which are hereby incorporated herein by reference.

In some alternative embodiments according to the invention, the location determination circuit 260 is a network location circuit that uses location information provided by the network 10, such as a base station ID for the base station 30 servicing the mobile terminal 20, that has location information associated therewith. In some other embodiments according to the invention, the location determination circuit 260 is a local area network location circuit that uses location information provided via the local wireless network 270 (through a local wireless interface circuit not shown) to determine the location information for the mobile terminal. Other location determination approaches may be used. In some embodiments according to the invention, the local area network is a WLAN compliant network. In some other embodiments according to the invention, the local wireless network 270 is a Bluetooth compliant interface. In any event, the local wireless network 270 can be used to provide information to the location determination circuit 260 to determine the location information for the mobile terminal 20.

A memory 253 can store computer program instructions that, when executed by the processor circuit 251, carry out the operations described herein and shown in the figures. The memory 253 can be non-volatile memory, such as EEPROM (flash memory), that retains the stored data while power is removed from the memory 253. In some embodiments, the memory 253 can also store a location information table including location information, such as most recently known location information/time information, for objects that are owned by a user associated with the mobile terminal.

Figure 3:
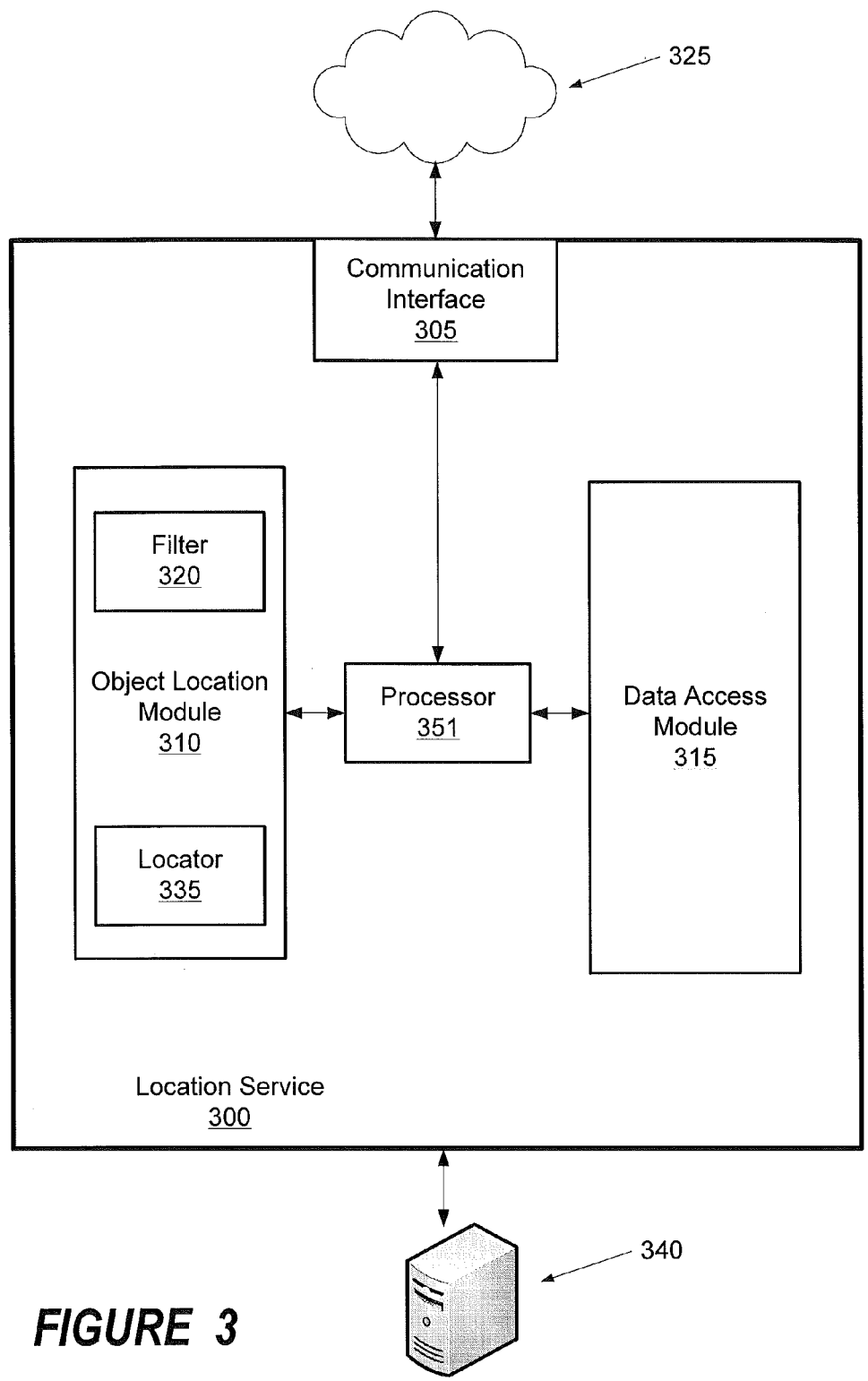
FIG. 3 is a schematic block diagram that illustrates computer server including a location service according to some embodiments of the invention.

FIG. 3 is a block diagram that illustrates embodiments of a computer server including a location service 300 according to the invention. The location service 300 is configured to provide location information associated with movable objects. As illustrated in FIG. 3, the location service 300 includes a processor 351, which, to the extent already described with reference to the, processor 251 of FIG. 2 will not be further described.

The processor 351 is coupled to a memory 340 that includes, for each of the movable objects, identification information associated with the respective movable object and an owner associated with the respective movable object. As the location service 300 has access to this information, the tag sensors providing ID information reports need not to have been provided notification of the identification information associated with the respective movable objects or of the owners associated with the respective moveable objects. While the memory 340 is shown in FIG. 3 as a data base remote from and communicatively coupled to the location service 340, it will be understood that the memory may be implemented on the computer server hosting the location service 300.

Also shown in FIG. 3 is a communication interface 305 coupled to the processor 351. The communication interface 305 is configured to receive tag identification (ID) information reports from tag sensors.

An object location module 310 executing on the processor 351 is configured to update location information associated with the movable objects, that is stored in the memory 340, responsive to received ID information reports to provide updated location information for the moveable objects. The illustrated object location module 310 includes a filter module 320 that is configured to select between received ones of the ID information reports to increase the accuracy of the stored updated location information for the movable objects. The illustrated object location module also includes a tag sensor locator module 335 that is configured to estimate a location of a tag sensor providing respective ones of the ID information reports. The object location module 310 may be configured to update the location information based on the estimated location of the tag sensor providing the respective ones of the ID information reports.

The illustrated embodiments of FIG. 3 also include a data access module 315 executing on the processor 351 that is configured to allow access to the location information associated with respective ones of the movable objects only to requestors authorized by the owner associated with the respective ones of the movable objects.

It is to be understood that the present invention is not limited to the particular configuration shown in FIGS. 1 through 3 (and FIG. 8 described later herein), but is intended to encompass any configuration capable of carrying out operations described herein. While particular functionalities are shown in particular blocks by way of illustration, functionalities of different blocks and/or portions thereof may be combined, divided, and/or eliminated. Moreover, the functionality of the hardware/software architecture of FIGS. 1 through 3 (and FIG. 8 described later herein) may be implemented as a single processor system or a multi-processor system in accordance with various embodiments of the present invention.

Figure 4:
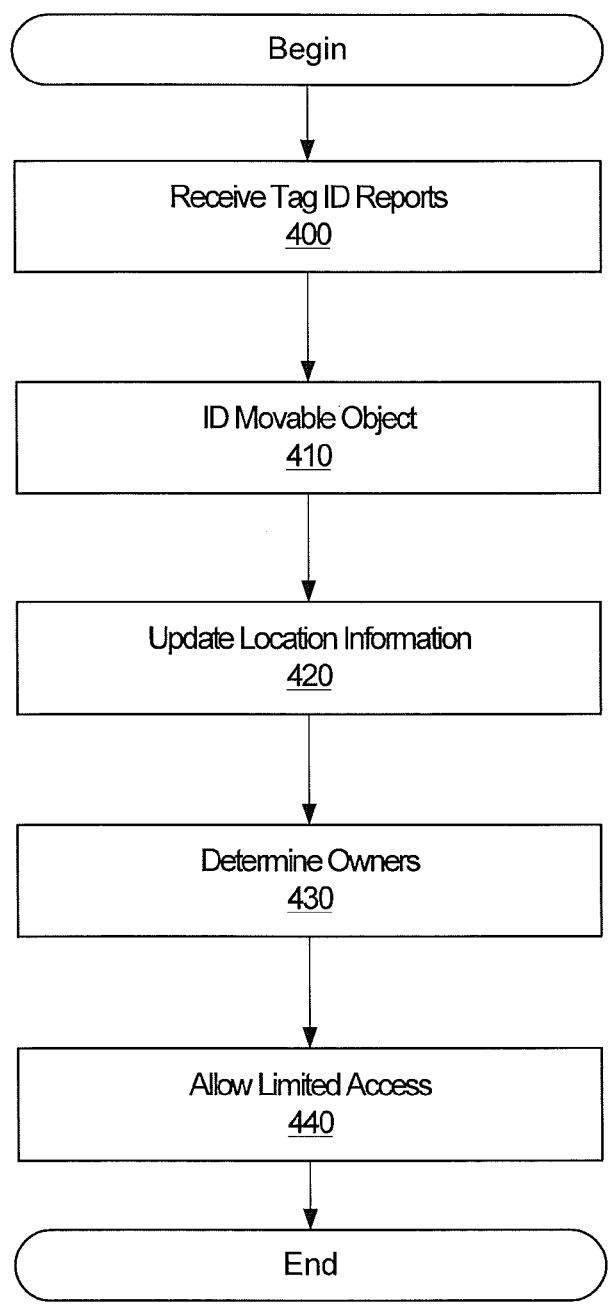
FIG. 4 is a flowchart that illustrates operations of methods, computer program products, and location services according to some embodiments of the invention.

FIG. 4 is a flowchart that illustrates operations of methods, computer program products, and location services according to some embodiments of the invention. It will be understood that the blocks illustrated in FIG. 4 may represent operations carried out for each of the moveable objects that are tracked by the location service. In addition, a given tag sensor may provide information related to multiple movable objects in its vicinity. For example, if three moveable objects having tags associated therewith are within range of the mobile terminal 20, the operations illustrated in the blocks of FIG. 4 may be carried out for each of the moveable objects and for reports from other tag sensors.

Operations for the embodiments of FIG. 4 begin at Block 400 with receiving tag identification (ID) information reports from a plurality of tag sensors at the location service. The tag sensors transmitting the reports have not been provided notification of ID information associated with the movable objects or of the owners associated with the moveable objects. A movable object associated with each of the ID information reports being received by the tag sensors is identified (Block 410). Identifying a movable object may include comparing ID information from the ID information report with stored information associating ID information with respective ones of the movable objects. In some embodiments as will be described later herein, the method may further include changing the ID information associated with the respective ones of the movable objects at selected times.

Location information associated with the movable objects is updated responsive to the received ID information reports to provide updated location information for the moveable objects (Block 420). An owner associated with each of the movable objects is determined (Block 430). Access is allowed to the location information associated with respective ones of the movable objects only to requestors authorized by the owner associated with the respective ones of the movable objects (Block 440). It will be understood that the operations described with reference to Block 440 related to providing access to location information will generally be carried out separately and independently from the operations related to maintaining/updating the location information. In other words, FIG. 4 illustrates operations that may be carried out by a location service according to some embodiments both for obtaining location information related to movable objects and controlling access to that location information where the users of the tag sensors providing the location information may not themselves be allowed access to the location information.

In some embodiments as will be discussed with reference to FIG. 5, different methods can be used that may improve the precision (accuracy) and validity of tag (movable object) locations by using many location records from different tag sensors. The identity of the tag sensor may be used to rate the validity of the tag location record. For instance, the owner of the tag may be rated a higher validity that other reporting tag sensors. False location records may be filtered out based on other location records. Also, the precision and location records from different tag sensors may be used to calculate a better precision than any of the individual sensors.

Figure 5:
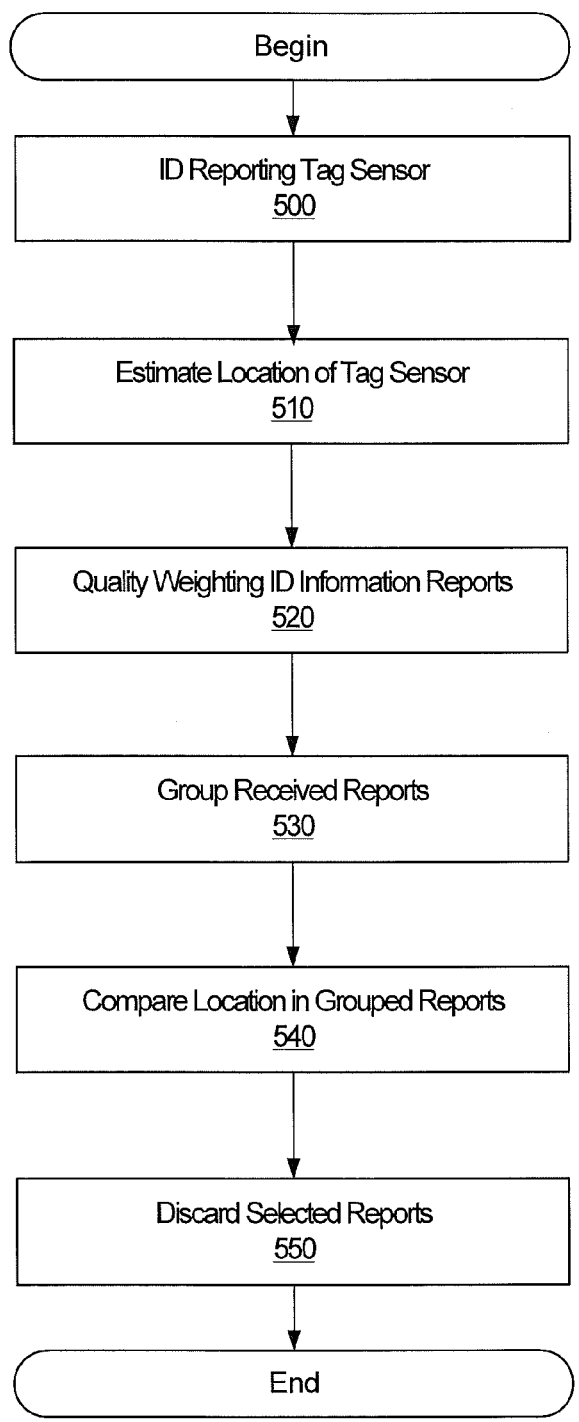
FIG. 5 is a flowchart that illustrates operations of methods, computer program products, and location services according to further embodiments of the invention.

Referring now to the embodiments of FIG. 5, operations for updating location information at Block 420 of FIG. 4 may include, for respective ones of the ID information reports, determining an identity of a reporting one of the tag sensors providing the respective one of the ID information reports (Block 500). For example, the identification of the tag sensors may be included in the ID information reports and/or determined at the establishment of communication between the tag sensors and the location service. A location of the identified reporting one of the tag sensors is estimated (Block 510). For example, estimating a location of the identified reporting one of the tag sensors may include obtaining Global Positioning System (GPS) location information for the reporting one of the tag sensors. The received ID information report from the reporting one of the tag sensors may include the GPS location information and obtaining the GPS location information may include retrieving the GPS location information from the received ID information report from the reporting one of the tag sensors.

In other embodiments, estimating a location of the identified reporting one of the tag sensors includes determining a fixed location communication node from which the ID information report from the reporting one of the tag sensors was first received. The fixed location communication node may be a base station of a wide area cellular network provider wherein determining the fixed location communication node may include receiving a location estimate for the tag sensor from the wide area cellular network provider. Referring again to FIG. 4, operations at Block 420 may include updating the location information for the movable object associated with the respective one of the ID information reports based on the estimated location of the reporting one of the tag sensors.

In further embodiments, operations at Block 420 may also include quality weighting selected ones of the received ID information reports based on a reliability characteristic for the reporting tag sensors providing the selected ones of the received ID information reports (Block 520). The reliability characteristic may be an association between the reporting ones of the tag sensors and the owner associated with the movable object associated with the respective selected ones of the ID information reports.

In yet other embodiments, operations at Block 420 may include grouping a plurality of the received ID information reports associated with a same one of the movable objects based on a filter time window of times associated with the respective ID information reports (Block 530). Locations of the identified reporting ones of the tag sensors for the grouped plurality of received ID information reports are compared (Block 540). Selected ones of the grouped plurality of received ID information reports are discarded based on comparing the locations of the identified ones of the tag sensors (Block 550). For example, if 10 readings were available, nine of which were similar and one of which was very different, the odd reading could be discarded.

Figure 6:
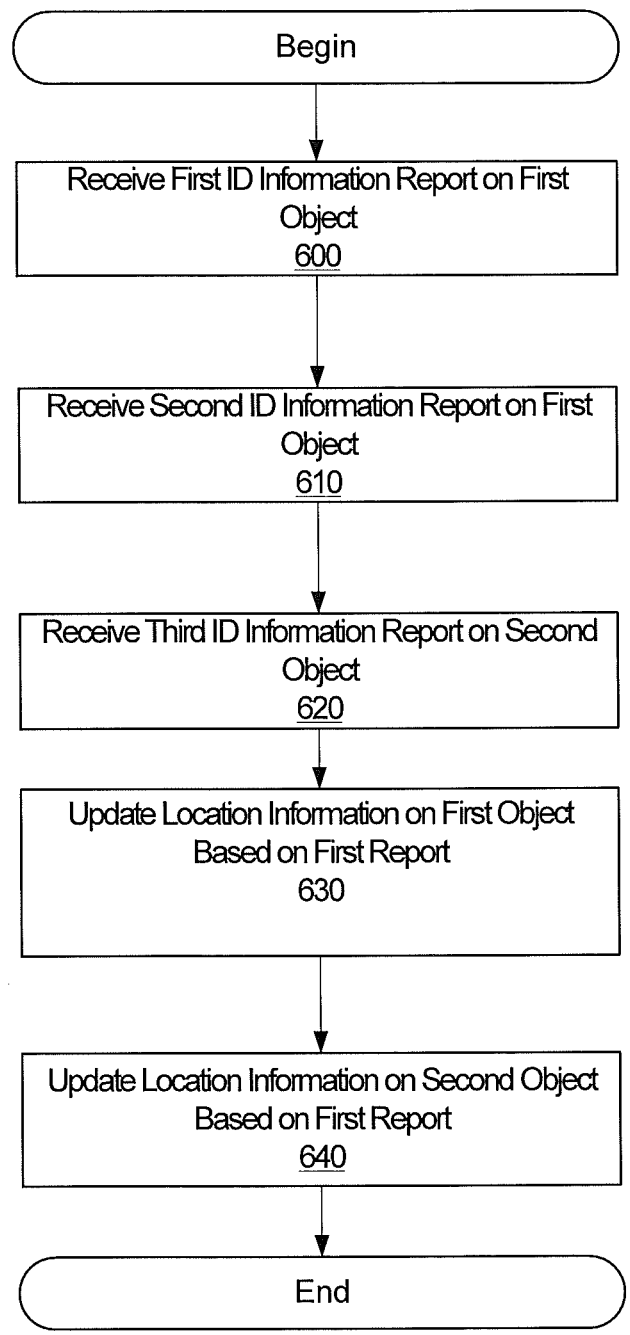
FIG. 6 is a flowchart that illustrates operations of methods, computer program products, and location services according to other embodiments of the invention.

Further embodiments of providing location information associated with movable objects will now be described with reference to the flowchart of FIG. 6. For the embodiments of FIG. 6, operations begin at Block 600 by receiving a first ID information report associated with a first movable object from a first tag sensor. The first tag sensor has an associated location accuracy. A second ID information report associated with the first movable object is received from a second tag sensor (Block 610). The second tag sensor has an associated location accuracy less than that of the first tag sensor. A third ID information report associated with a second movable object is received from the second tag sensor (Block 620). Each of the second and third ID information reports has an associated time falling within a same sample window.

The location information for the first movable object is updated based on the estimated location of the first tag sensor, not the estimated location of the second tag sensor, which should result in a more accurate location estimate for the movable object detected by both tag sensors (Block 630). The location information for the second movable object is updated based on the updated location information for the first movable object responsive to receiving the second and third ID information reports having associated times falling within the sample window, which should also result in a more accurate location estimate for the second object even though the first tag sensor itself did not submit a report on the second object (Block 640). In other words, as the first and second object are reported in the same location by the second (less accurate) tag sensor, the more accurate report on the first object by the first (more accurate) tag sensor may be a reliable indicator of the location of the second object. For example, the location of the first and second tags may be reported by a tag sensor in a car parking in a lot where a car linked to the first tag was already parked and reported by the more accurate first tag sensor. The first tag sensor may be a mobile terminal having GPS location information and the second tag sensor may be a mobile terminal not having GPS location information.

In some embodiments, precision may be improved by calculating the center point from a set of ID information reports close in time and space. Assuming the tag/movable object is not moved, a set of identification reports will be within range of the movable object. When many random reports are available, it is probable that the different reports will be spread out around the exact location. Therefore it is more probable that the object will be closer to the center point of the different reported locations than any of the outer locations. Such may provide improved precision even with many reports from the same tag sensor. In some embodiments, a plurality of tags reported by one tag sensor within a certain time window are grouped and considered having same position. If any of the grouped tags already have a more accurate position reported, the more accurate position may be used for all of the grouped tags. If several of the grouped tags have more accurate position, the one with the most accuracy may be used to specify the location.

Figure 7:
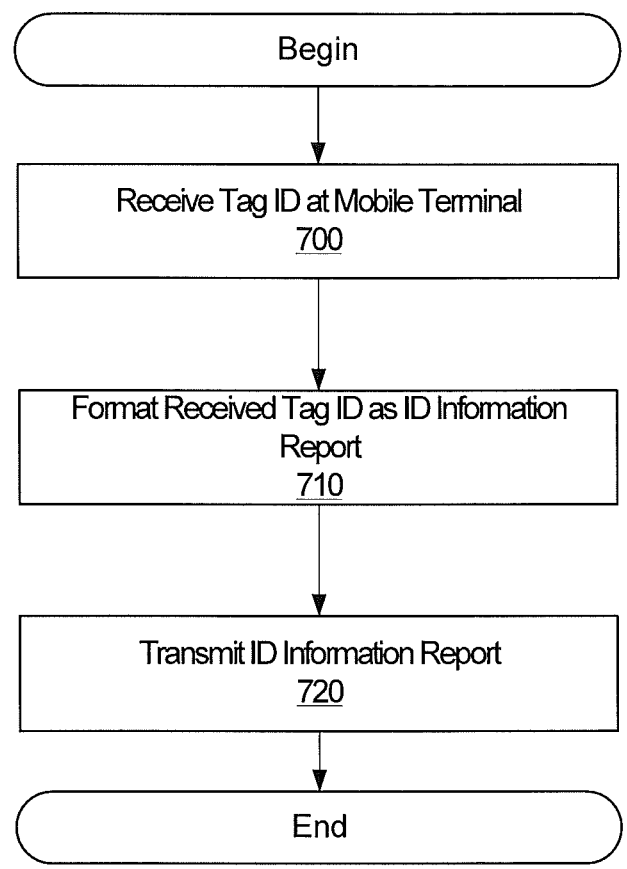
FIG. 7 is a flowchart that illustrates operations of methods, computer program products, and tag sensors according to some embodiments of the invention.

Operations performed by a tag sensor according to some embodiments of the present invention, where the tag sensor is a mobile terminal, will now be described with reference to FIG. 7. For the embodiments of FIG. 7, operations begin at Block 700 by receiving a tag identification at a mobile terminal using a short range wireless transmission protocol. The mobile terminal does not have any knowledge of the source of the received tag identification. An identifier of the tag sensor may also be added. The received tag identification is formatted as an ID information report (Block 710). The ID information report is transmitted to a location service over a wide area cellular network communicatively coupled to the mobile terminal (Block 720). The tag sensor may wait until no tag identifications are received from the tag before formatting and transmitting the information report, which may reduce power usage by the tag sensor. Updated location information may still be maintained by the tag sensor so that current location information is readily available at the time of transmission of the ID information report, particularly as operations such as GPS setup may be slow on a first search. Operations at Blocks 700-720 may be carried out for a plurality of tag identifications received by the mobile terminal from a location of the mobile terminal. Formatting the received tag information at Block 710 may include adding location information for the mobile terminal to the ID information report.

The tag identification received at Block 700 may be received from a battery powered electronic tag configured to transmit its tag identification at specified intervals using the short range wireless protocol. The tag further may include a memory including a plurality of identifications. The tag may be configured to select a different one of the plurality of identifications to transmit as its tag identification at specified intervals as will be described further herein.

Figure 8A:
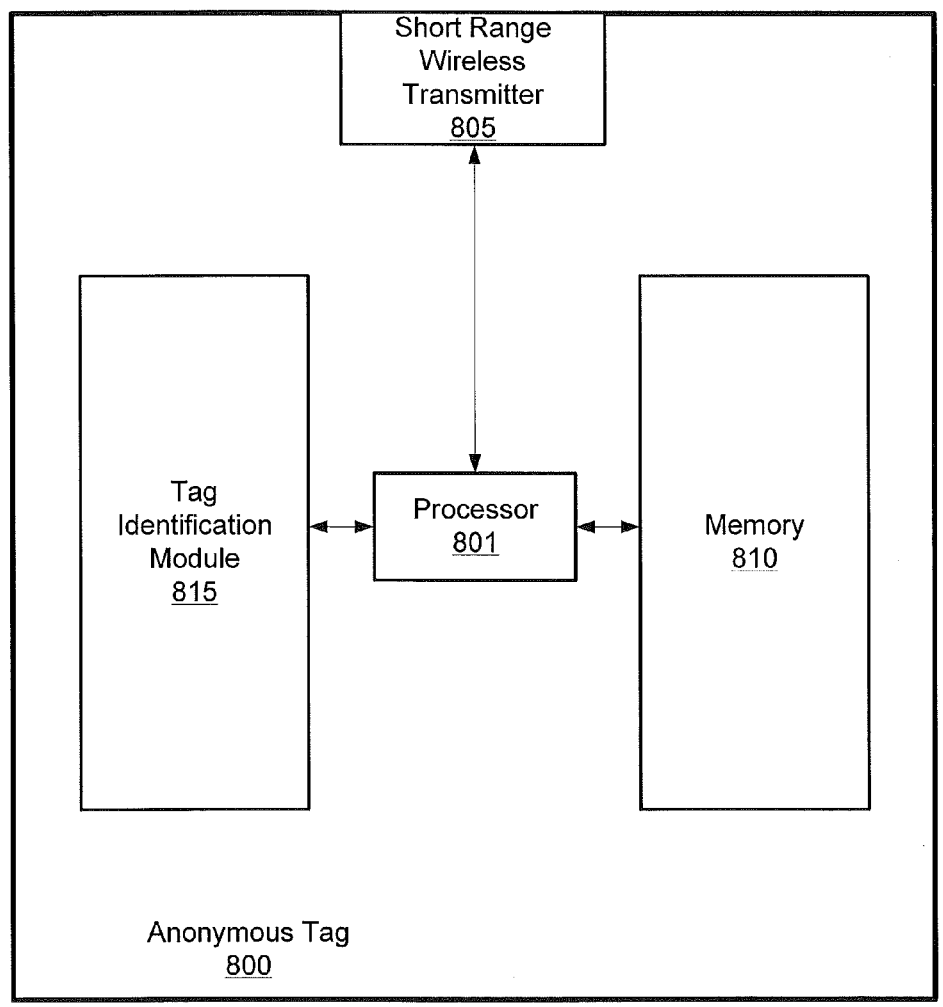
FIG. 8A is a schematic block diagram that illustrates an anonymous tag according to some embodiments of the invention.

FIG. 8A is a block diagram that illustrates embodiments of an anonymous tag, that may be, for example, used in the above described method of locating movable objects, according to other embodiments of the present invention. The anonymous tag 800 is configured to reduce the risks of observers identifying the object associated with the tag by changing its transmitted tag identification. In the illustrated embodiments, the anonymous tag 800 includes a processor 801, that may generally conform to the description of the processors 251, 351 except to the extent described otherwise herein. A short range wireless transmitter 805 is coupled to the processor 801. The transmitter 805 may be, for example, a low power Bluetooth protocol transmitter or an ANT protocol transmitter. The ANT protocol is designed and marketed by Dynastream Innovations Inc., a Cochrane, Canada based company. The ANT protocol does not use a Media Access Control (MAC) address. Inclusion of a static identification, such as the MAC address, may cause a loss of anonymity.

A memory 810 is coupled to the processor 801. The memory 810 includes a unique identity number for the tag 800 and at least one key for use in encoding by the tag 800. A tag identification module 815 is configured to execute on the processor that repeatedly changes the transmitted tag identification as will be further described herein.

Figure 8B:
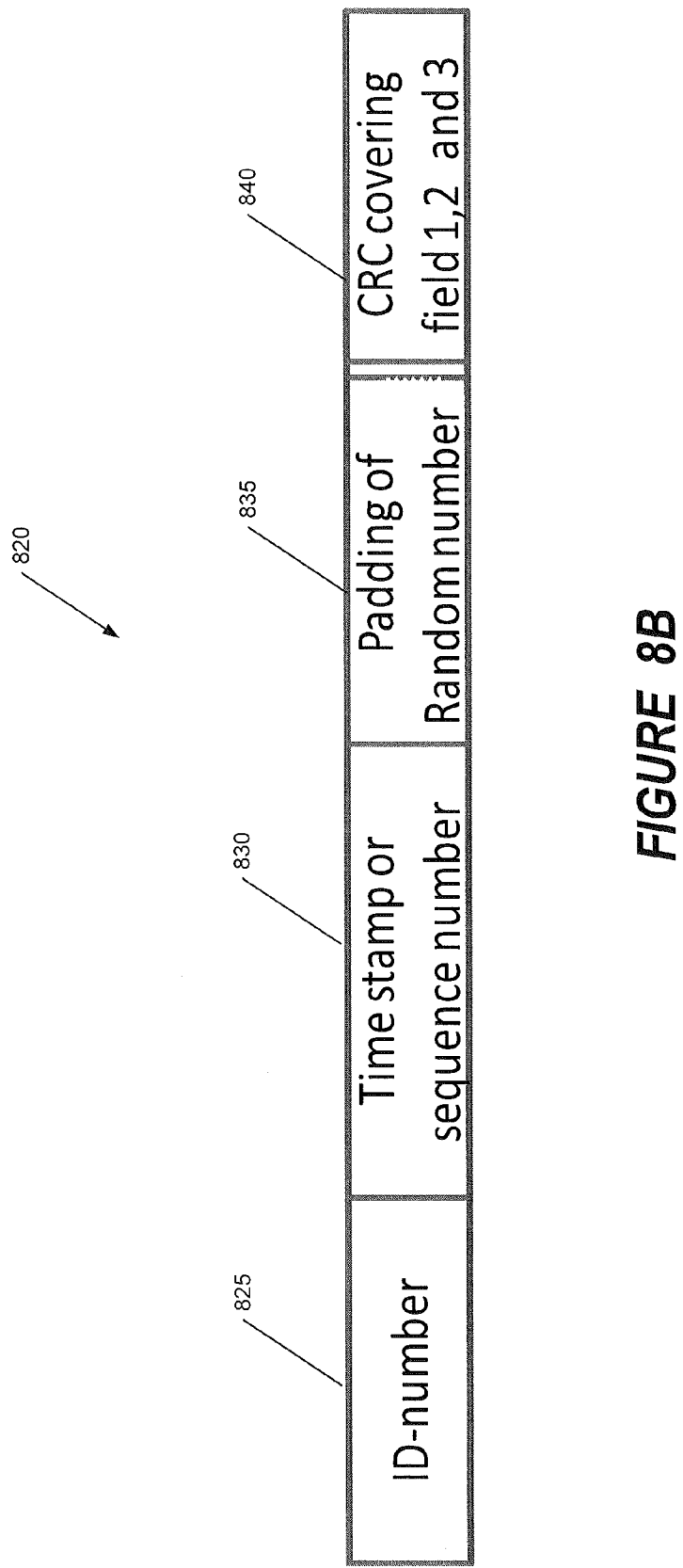
FIG. 8B is a schematic block diagram that illustrates the format of a tag identification prepared by a tag before encryption according to some embodiments of the invention.

FIG. 8B is a block diagram that illustrates the format of one embodiment of a tag identification 820 prepared by a tag before encryption and transmission of the tag identification. In the illustrated embodiment either a time stamp sequence number 830 and a padding random number 835 are added to an ID-number 825 of the tag by appending them to the ID number 825. A CRC 840 is also calculated covering fields 825, 830 and 835 and appended before encryption to provide the tag identification for transmission using a short range wireless transmitter.

Figure 8C:
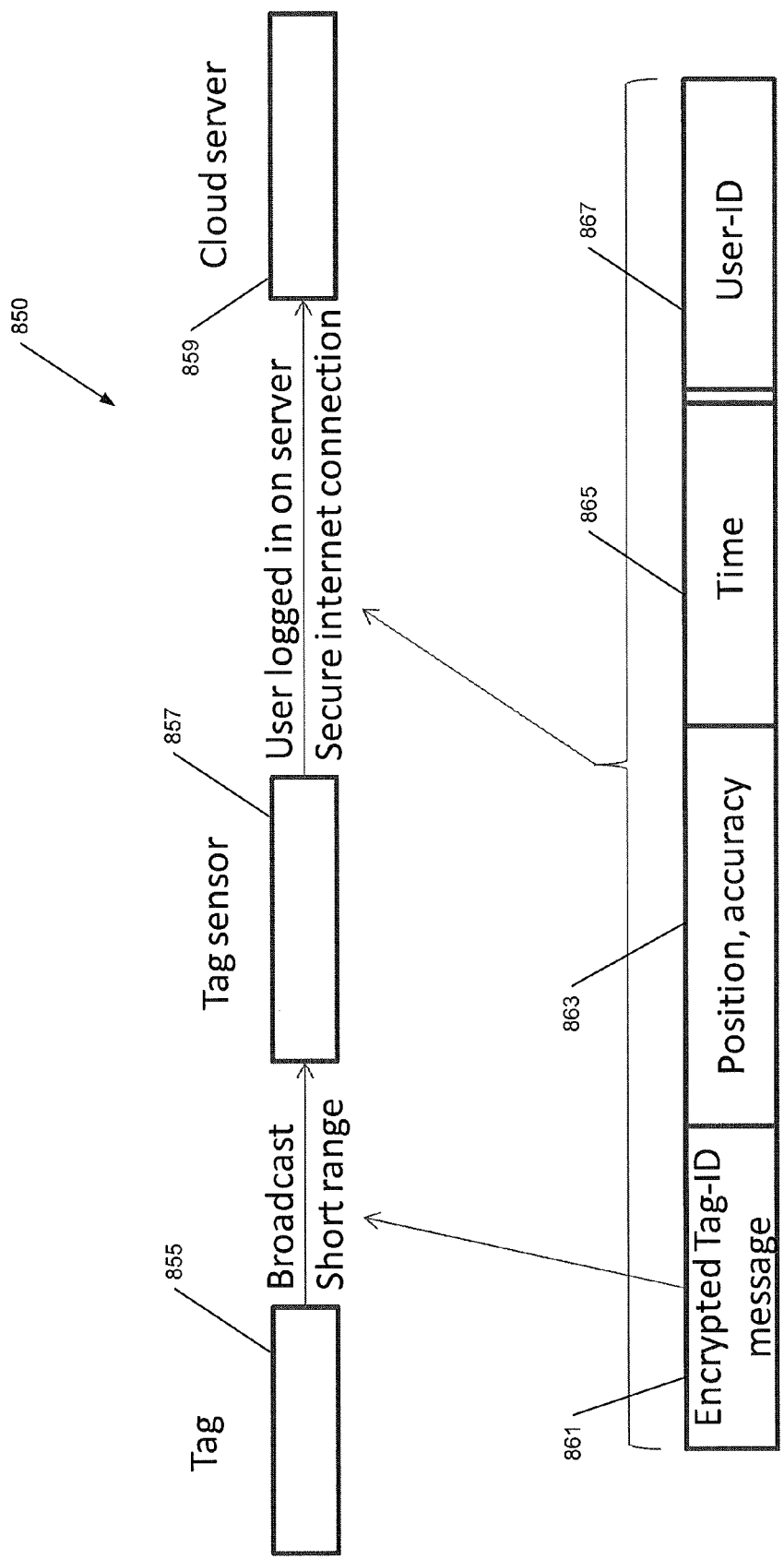
FIG. 8C is a block diagram that illustrates transmitted infonnation according to some embodiments including a schematic illustration of embodiments of an ID information report format transmitted from a tag sensor to a location service.

FIG. 8C is a block diagram that illustrates transmitted information according to some embodiments including a schematic illustration of embodiments of an ID information report format transmitted from a tag sensor to a location service. As seen in the embodiments of FIG. 8C, an anonymous tag 855 transmits/broadcasts its encrypted tag identification 861 (which may be the encrypted version of the tag identification illustrated in FIG. 8B). A tag sensor 857 receives the broadcast tag identification and formats the received tag identification 861 by appending, for example, location information 863 for the tag sensor 857 including information indicating an accuracy thereof, a time stamp (and/or sequence number) 865 and, optionally, a user identification 867 linked to a user associated with the tag sensor 857 (by logging into the system or the like). The tag sensor then transmits the formatted ID information report to the location server 859 executing the location service application. The location server 859 in the embodiments of FIG. 8C is shown as a "Cloud" server accessed using, for example, an IP protocol. In particular, the tag sensor 857 may, at some point prior to transmission of the ID information report, establish a secure internet connection with the server 859, for example, by having the user of the tag sensor 857 open a browser capable application on the tag sensor 857, establishing a connection to a location service executing on the location server 859 and logging into the location service.

Figure 9:
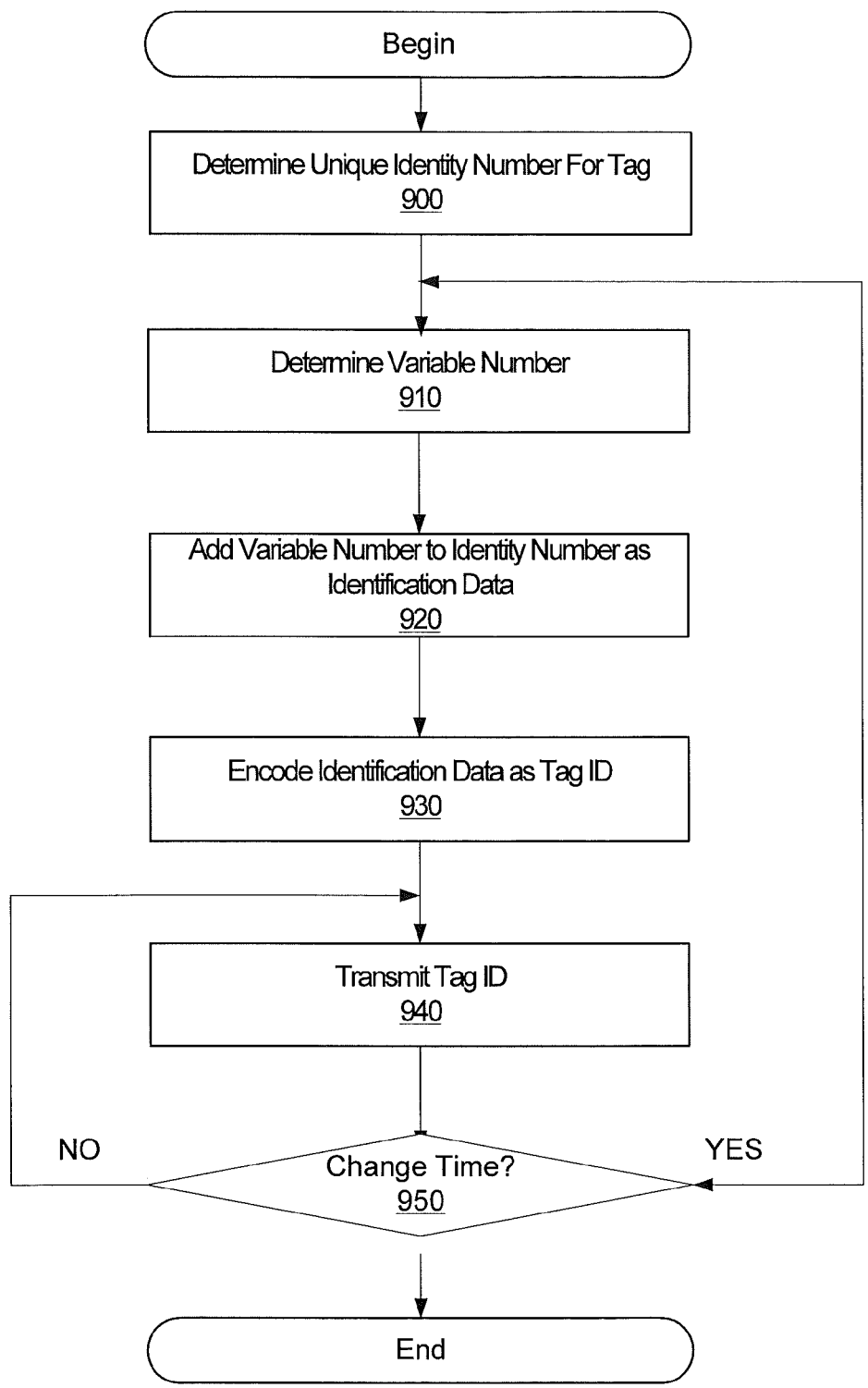
FIG. 9 is a flowchart that illustrates operations of methods, computer program products, and anonymous tags according to some embodiments of the invention.

Referring now to the embodiments of FIG. 9, operations for providing an anonymous short range wireless transmitter tag for use in locating a movable object that are carried out by the tag include determining a unique identity number for the tag (Block 900). A variable number is determined for inclusion with the unique identity number (Block 910). For example, the variable number may be time associated stamps and/or sequence numbers. The time associated stamps may be generated by the tag based on a clock of the tag. The sequence numbers may be generated by the tag based on a number of transmissions of the tag identification since an initial reference transmission. The variable number may further include a random number. The random number may be generated for use in a padding scheme based on a method used for encoding (encrypting) the identification data at Block 930. Such a padding number increase the total message length, which may make it harder for unauthorized receivers to crack the code (decrypt the message).

The variable number (which may include the padding number) is added to the identity number to provide identification data for the tag (Block 920). In some embodiments, after the operations at Block 920 and before the operations at Block 930, a cyclical redundancy check (CRC) is calculated for the identification data and added to the identification data.

The identification data is encoded for transmission by the short range wireless transmitter as a tag identification (Block 930). Operations at Block 930 may include encoding the identification data and CRC for transmission by the short range wireless transmitter as the tag identification where a CRC is calculated. More particularly, the encoding may be, for example, asymmetric key encryption. Operations at Block 930 may include identifying a public key for use in encoding the identification data. The tag identification is transmitted using a short range wireless protocol (Block 930).

It is then determined at Block 950 if a selected interval has passed and it is time to generate a new tag identity. If not, operations return to Block 940 periodically to repeat transmission of the already calculated tag identity. If the selected interval, which is no more than one hour in some embodiments, has passed, operations return to Block 910 to choose a new variable number and repeat the operations at Blocks 920 to 950 with the new variable number. Selection of a shorter interval may reduce the time where anonymity is lost to the extent that an object may be tracked during that period of time at the cost of an increase in processing burden and power consumption, which may shorten the expected life of a battery powered tag. In some embodiments where a public key is selected at Block 930, the repeated operation for encoding with the new variable number may be preceded by selecting a new public key for use in encoding the new identification data and encoding the new identification data may include encoding the new identification data using the new public key. The new public key may be selected by the tag based on a table of public keys to be used in sequence stored in the tag 800. However, it will be understood that, in some embodiments, different tags may use different public keys but any given tag will continue to use the same public key.

As was previously described within the context of a location service using the tag identity information, the tag identity transmitted at Block 940 may be received and formatted at a tag sensor and then transmitted to a remote server computer. The server computer may receive the transmitted new tag identification from a tag sensor that received the new tag identification from the tag, determine a key to use in decoding the received tag identification using information provided to both the tag and the server computer that was not provided to the tag sensor and decode the received tag identification using the determined key. The server computer may then extract the unique identity number for the tag 800 from the decoded tag identification and identify the tag transmitting the received tag identification based on the extracted unique identity number.

Figure 10:
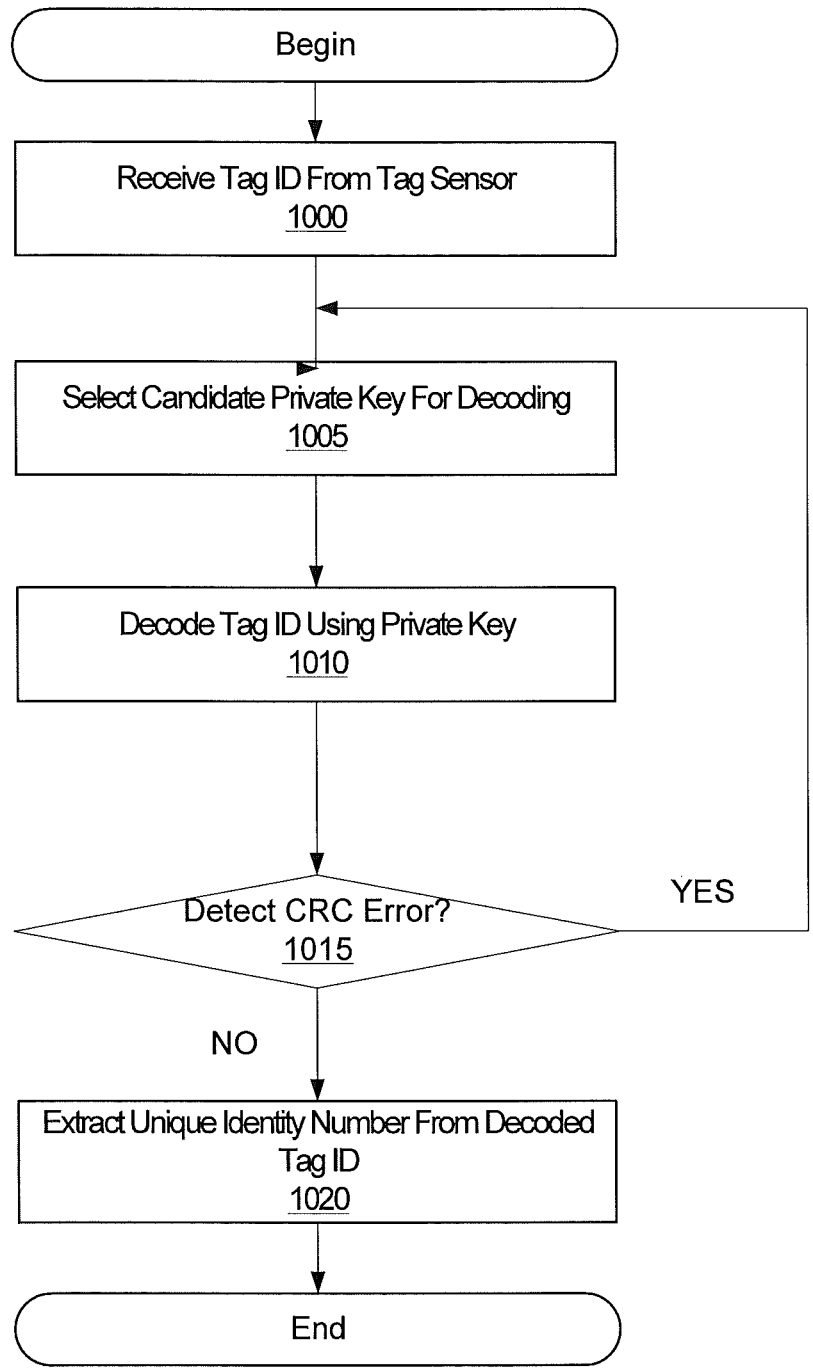
FIG. 10 is a flowchart that illustrates operations of methods, computer program products, and server computers for anonymous tags according to some embodiments of the invention.

Referring now to the embodiments of FIG. 10, operations for providing an anonymous short range wireless transmitter tag that are carried out at the remote server computer will now be further described. Operations begin at Block 1000 by receiving the transmitted new tag identification from a tag sensor that received the new tag identification from the tag. A candidate private key to use in decoding the received tag identification is selected using information about public keys provided to both the tag and the server computer that was not provided to the tag sensor (Block 1005). The received tag identification is decoded using the selected private key (Block 1010). It is then determined if an error has been detected based on a CRC extracted from the decoded tag identification, which may be carried out using conventional error detection/correction methods (Block 1015). If an error is detected at Block 1015, operations return to Block 1005 and a next candidate private key to use in decoding the received tag identification is selected responsive to detecting the error. Operations at Blocks 1010 and 1015 are repeated using the next candidate private key. In some embodiments, rather than using a CRC, a special predefined pattern is used that is available in a decrypted message. If the pattern is identified (after decrypt) the correct key is most likely used. However, use of a CRC has the advantage of detecting and even correcting errors.

If no error is detected at Block 1015, the unique identity number is extracted from the decoded tag identification and the tag transmitting the received tag identification is identified based on the extracted unique identity number (Block 1020).

Although various embodiments of the present invention are described in the context of wireless communication terminals for purposes of illustration and explanation only, the present invention is not limited thereto. It is to be understood that the present invention can be more broadly used in any sort of electronic device configured to serve as a tag sensor. In addition, anonymous tags as described herein may be used in applications other than location services. By using constantly changing pseudo-random tag identifications, it may be possible to protect the privacy/integrity of the tag owners and, hence, limit or even prevent other unauthorized users from tracking the tags. In addition to protecting owner privacy, the anonymous tags could also protect the location service gathering the data by increasing the difficulty of offering a competing location service using the tags attached to the movable objects.

In some embodiments, the unique tag identity number (Block 900) may be 64 bits. In some embodiments, the encoding uses a public/private key encryption method that may differ from conventional public/private key approaches in that the public key is also not publicly known. The tags may be provided the public keys and the server computer/location service may be provided both public and private keys. In "asymmetric key encryption," it is sufficient if tags include the public key and the location service keep the private key(s), which is associated the public key(s) (i.e., is information about the public key(s)). As such, the information about public key(s) that is provided to the tag and the location service need not be the same information.

What is important is that the private key is not known to anyone but the location service. Where the public key is changed to further protect privacy, the CRC could be used to help the location service determine the public key currently in use by a tag after a change (to define the corresponding private key to use in decoding). Time stamps and sequence numbers may also be used to help filter out destructive attacks, such as recorded and later re-transmitted messages, such as from a different location. It may also be beneficial to keep the public keys secret. By protecting private keys, others may be prevented from producing unlicensed tags. Information reports encrypted with a wrong public key may never be accepted by the location service.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A computer-implemented method of providing location information associated with moveable objects, the method comprising:
    receiving tag identification (ID) information reports from a plurality of tag sensors, wherein receiving ID information reports includes: receiving a first ID information report associated with a first movable object from a first tag sensor from the plurality of tag sensors, the first tag sensor having an associated location accuracy; receiving a second ID information report associated with the first movable object from a second tag sensor from the plurality of tag sensors, the second tag sensor having an associated location accuracy less than that of the first tag sensor; and receiving a third ID information report associated with a second movable object from the second tag sensor, wherein each of the second and third ID information reports has an associated time falling within a same sample window;
    identifying each of the movable objects associated with each of the ID information reports received from the plurality of tag sensors;
    updating location information associated with each of the movable objects responsive to the received ID information reports to provide updated location information for each of the moveable objects;
    determining an owner associated with each of the movable objects; and
    allowing access to the updated location information associated with respective ones of the movable objects only to requestors authorized by the owner associated with the respective ones of the movable objects, wherein the plurality of tag sensors have not been provided notification of ID information associated with each of the movable objects or of the owners associated with each of the moveable objects.

2. The method of claim 1, wherein identifying each of the movable objects comprises comparing ID information from the ID information reports with stored information associating ID information with respective ones of the movable objects and wherein the method further comprises changing the ID information associated with the respective ones of the movable objects at selected times.

3. The method of claim 1, wherein updating location information comprises, for respective ones of the ID information reports:
    determining an identity of a reporting one of the plurality of tag sensors providing a respective one of the ID information reports;
    estimating a location of the identified reporting one of the plurality of tag sensors; and
    updating the location information for the movable object associated with the respective one of the ID information reports based on the estimated location of the identified reporting one of the plurality of tag sensors.

4. The method of claim 3, wherein updating location information further comprises:
    grouping a plurality of the received ID information reports associated with a same one of the movable objects based on a filter time window of times associated with respective ones of the received ID information reports;
    comparing locations of identified reporting ones of the plurality of tag sensors for the grouped plurality of the received ID information reports; and
    discarding selected ones of the grouped plurality of the received ID information reports based on comparing the locations of the identified reporting ones of the plurality of tag sensors.

5. The method of claim 3, wherein updating location information further comprises quality weighting selected ones of the received ID information reports based on a reliability characteristic for the identified reporting one of the plurality of tag sensors and providing the quality weighted selected ones of the received ID information reports.

6. The method of claim 5, wherein the reliability characteristic comprises an association between the identified reporting ones of the plurality of tag sensors and the owner associated with the movable object associated with respective ones of the quality weighted selected ones of the received ID information reports.

7. The method of claim 3,
    wherein updating location information includes:
    updating the location information for the first movable object based on the estimated location of the first tag sensor, not the estimated location of the second tag sensor; and
    updating the location information for the second movable object based on the updated location information for the first movable object responsive to receiving the second and third ID information reports having associated times falling within the sample window.

8. The method of claim 7, wherein the first tag sensor comprises a mobile terminal having GPS location information and the second tag sensor comprises a mobile terminal not having GPS location information.

9. The method of claim 1, wherein the plurality of tag sensors are mobile terminals and wherein receiving the ID information reports is preceded by:
- receiving a tag identification using a short range wireless transmission protocol at one of the plurality of tag sensors, wherein the one of the plurality of tag sensors does not know which moveable object is associated with the received tag identification;
- formatting the received tag identification as an ID information report; and then
- transmitting the ID information report to a location service over a wide area cellular network communicatively coupled to the one of the plurality of tag sensors.

10. The method of claim 9, wherein the tag identification is received from a battery powered electronic tag configured to transmit its tag identification at specified intervals using the short range wireless transmission protocol.

11. The method of claim 10, wherein the battery powered electronic tag further comprises a memory including a plurality of identifications and wherein the battery powered electronic tag is configured to select a different one of the plurality of identifications to transmit as its tag identification at specified intervals.

12. The method of claim 10, wherein the battery powered electronic tag has a unique identity number and the battery powered electronic tag is further configured to repeatedly:
- determine a new variable number;
- add the new variable number to the unique identity number to provide identification data for the battery powered electronic tag;
- encode the identification data for transmission as its tag identification; and
- transmit its tag identification using the short range wireless transmission protocol, wherein determining a new variable number, adding the new variable number and encoding the identification data are repeated so that the transmitted tag identification is changed after a selected interval.

13. A location server for providing location information associated with movable objects, the location server comprising:
- a processor;
- a memory coupled to the processor that includes, for each of the movable objects, identification information associated with a respective movable object and an owner associated with the respective movable object;
- a communication interface coupled to the processor that is configured to receive tag identification (ID) information reports from a plurality of tag sensors;
- an object location module executing on the processor that is configured to update location information associated with each of the movable objects, that is stored in the memory, responsive to the received ID information reports to provide updated location information for each of the moveable objects;
- a data access module executing on the processor that is configured to allow access to the location information associated with respective ones of the movable objects only to requestors authorized by the owner associated with the respective ones of the movable objects,
- wherein the plurality of tag sensors have not been provided notification of the identification information associated with each of the movable objects or of the owners associated with each of the moveable objects, and
- wherein the processor is further configured to receive a first ID information report associated with a first movable object from a first tag sensor from the plurality of tag sensors, the first tag sensor having an associated location accuracy; receive a second ID information report associated with the first movable object from a second tag sensor from the plurality of tag sensors, the second tag sensor having an associated location accuracy less than that of the first tag sensor; and receive a third ID information report associated with a second movable object from the second tag sensor, wherein each of the second and third ID information reports has an associated time falling within a same sample window.

14. The location server of claim 13, wherein the object location module includes a filter module that is configured to select between respective ones of the received ID information reports to increase the accuracy of the stored updated location information for each of the movable objects.

15. The location server of claim 13, wherein the object location module includes a tag sensor locator module that is configured to estimate a location of a tag sensor providing respective ones of the received ID information reports and wherein the object location module is configured to update the location information based on the estimated location of the tag sensor providing the respective ones of the received ID information reports.

* * * * *

UNITED STATES PATENT AND TRADEMARK OFFICE
CERTIFICATE OF CORRECTION

| | | |
|---|---|---|
| PATENT NO. | : 9,049,559 B2 | Page 1 of 1 |
| APPLICATION NO. | : 13/496976 | |
| DATED | : June 2, 2015 | |
| INVENTOR(S) | : Ljung et al. | |

It is certified that error appears in the above-identified patent and that said Letters Patent is hereby corrected as shown below:

In the specification

Column 5, Line 37: delete "infonnation according to" insert -- information according to --

Signed and Sealed this
Fifth Day of April, 2016

Michelle K. Lee
*Director of the United States Patent and Trademark Office*